United States Patent [19]

Sartoretto

[11] Patent Number: 4,591,375

[45] Date of Patent: May 27, 1986

[54] UREA-ACETALDEHYDE AND UREA-ACETALDEHYDE-PROPIONALDE-HYDE SOLUTIONS

[75] Inventor: Paul Sartoretto, North Brunswick, N.J.

[73] Assignee: W. A. Cleary Chemical Corporation, Somerset, N.J.

[21] Appl. No.: 782,029

[22] Filed: Sep. 30, 1985

Related U.S. Application Data

[63] Continuation-in-part of Ser. No. 551,315, Nov. 13, 1983, abandoned.

[51] Int. Cl.$^4$ .............................................. C05C 9/00
[52] U.S. Cl. ................................... 71/28; 71/64.1; 544/256; 71/29; 558/156
[58] Field of Search ............................. 71/27–30, 71/64.1; 544/256; 156/307.3; 260/932

[56] References Cited

U.S. PATENT DOCUMENTS

| | | | |
|---|---|---|---|
| 2,729,611 | 1/1956 | Chesley, Jr. et al. | 260/29.4 |
| 3,190,742 | 6/1965 | Brandeis | 71/28 |
| 3,462,256 | 8/1969 | Justice et al. | 71/28 |
| 3,914,229 | 10/1975 | Martin et al. | 544/256 |
| 4,003,965 | 1/1977 | Birum | 260/932 |
| 4,244,727 | 1/1981 | Moore, Jr. | 71/29 |
| 4,298,512 | 11/1981 | Sartoretto et al. | 260/29.4 R |
| 4,332,610 | 6/1982 | Sartoretto et al. | 71/28 |

*Primary Examiner*—Ferris H. Lander
*Attorney, Agent, or Firm*—Abraham Wilson

[57] ABSTRACT

A process for the preparation of neutralized, clear, stable solutions by acid catalyzed reaction of urea and aldehydes where the aldehydes are either acetaldehyde or mixtures of not more than 3 moles of propionaldehyde to 1 mole of acetaldehyde, at reaction pH's of from about 3.1 to 4.5 at temperatures from about 30° C. to 75° C. and the mole ratio of urea to aldehydes is about 1.3:1 to 2.5:1. The products of the process are useful as sprayable sources of nitrogen which are non phytotoxic and have prolonged fertilizer activity.

14 Claims, No Drawings

UREA-ACETALDEHYDE AND UREA-ACETALDEHYDE-PROPIONALDEHYDE SOLUTIONS

RELATED APPLICATIONS

This application is a continuation-in-part of my pending application, Ser. No. 551,315 filed Nov. 13, 1983 and now abandoned.

BACKGROUND OF INVENTION

This invention relates to the preparation of clear, stable solutions of urea-acetaldehyde and urea-acetaldehyde-propionaldehyde mixtures and to the compositions thereof where the clear solutions are useful as non-burning, easily applicable fertilizers with long lasting nitrogen release characteristics.

Insoluble reaction products are to be expected when urea is reacted with formaldehyde, higher aldehydes or mixtures of aldehydes in aqueous acid medium. For example Hans Brandeis et al, U.S. Pat. No. 3,190,742 have shown that the reactions of between one to two moles of urea to one mole of acetaldehyde at acid pH's below 3.0 produce insoluble condensation products of urea and acetaldehyde consisting essentially of crotylidenediurea in mother liquor. Louis C. Chesley, Jr., in U.S. Pat. No. 2,729,611 has reacted urea with formaldehyde in a two stage reaction involving an excess of formaldehyde over urea in which the first stage is carried out at pH's higher than seven and the second stage, where the pH is dropped to 2.5 to 6 and formaldehyde added, produces a "colloidal suspension" upon neutralization. Other examples are numerous and demonstrate the principle that urea-aldehyde reactions in acid media generally produce insoluble products.

The preparation of clear solutions of the reaction products of urea and formaldehyde generally require basic reaction conditions and are exemplified by U.S. Pat. No. 3,462,256 to Ged H. Justice et al and by U.S. Pat. No. 4,244,727 to William P. Moore. The utility of the application of a clear, stable solution of partially condensed urea and formaldehyde to the foilage of living plants has been extensively discussed by Moore in U.S. Pat. No. 4,244,727, but of course a principal consideration is the ease with which a clear solution may be applied from a sprayer without causing clogging as may result from use of a slurry.

According to the present invention, it has been found possible to prepare clear solutions of the reaction products of urea and acetaldehyde and urea and mixtures of acetaldehyde and propionaldehyde when the reactions are carried out in aqueous acid media.

It is an object of this invention to provide stable, clear solutions of urea and acetaldehyde and urea and mixtures of acetaldehyde and propionaldehyde reaction products which release nitrogen to plants in a controlled manner over a long period of time without being phytotoxic.

It is another object of this invention to produce clear solutions of urea and acetaldehyde and urea and mixtures of acetaldehyde and propionaldehyde reaction products which are stable and capable of being stored for long periods of time without forming precipitates of crotilidenediurea and related compounds.

It is another object of this invention to produce clear nitrogen producing solution blendable with sources of phosphorus and potassium or other plant nutrients to provide total liquid fertilizers.

SUMMARY OF THE INVENTION

Generally, when urea is reacted with formaldehyde, acetaldehyde or a mixture of aldehydes in ratios of about 1:1 to 2.5:1 urea to aldehyde in acidic medium an insoluble reaction product is formed. The insoluble product may be prepared as a stable dispersion useful as a sprayable liquid fertilizer. See for example Paul Sartoretto et al, U.S. Pat. No. 4,298,512. Thus I have discovered an unusual and surprising result in that the reaction of urea with acetaldehyde or urea with mixtures of acetaldehyde and propionaldehyde in aqueous acidic medium at conditions expected to produce insoluble reaction products yields clear stable solutions of products when the reaction pH is from about 3.1 to about 4.5.

The reaction is carried out in aqueous medium, the order of addition of the reactants not being important. The reactants may be mixed at room temperature. The addition of a mineral acid such as sulfuric acid is used for acidification, but any other suitable acid may be used for the adjustment. The pH, at which the reaction to produce clear solutions results, is from about 3.1 to 4.5, a preferred range being from about 3.1 to 4.0. At lower or higher pH's, the formation of insoluble products may occur. The addition of acid starts the reaction which is exothermic. The reaction takes place over a temperature range of from about 30° to 75° C., with a preferred range being 40° to 70° C.

The reaction is terminated by adjusting the pH to about 6.5 to 8.0 and cooling. The preferred pH range is about 6.8 to 7.5. Any strong inorganic base may be used in adjusting the pH, caustic potash having been used in the examples given below.

The mole ratio of urea to aldehyde useful in this invention is from about 1.3:1 to 2.5:1 with a preferred range of about 1.3:1 to 2:1. The useful range of nitrogen concentrations generally is from about 10% to 22% based on the weight of nitrogen in the urea, with a preferred nitrogen concentration of from about 12% to 20%.

"Aldehyde", referred to in the paragraph above, means acetaldehyde or a mixture of propionaldehyde and acetaldehyde wherein the mole ratio of propionaldehyde to acetaldehyde is not greater than 3:1.

DETAILED DESCRIPTION OF THE PREFERRED EMBODIMENTS

The following examples illustrate the preparation of clear, stable solutions of the reaction products of urea and acetaldehyde and urea and mixtures of acetaldehyde and propionaldehyde and the utilization of the nitrogen fertilizers thus prepared to provide nutrient to plant material on a sustained basis with little or no tip burning.

EXAMPLE 1

This example demonstrates the preparation of a stable clear solution of the reaction product of urea and acetaldehyde.

About 244 g. of 98% urea (4 moles) beads were dissolved in about 250 g. of water. The pH of this solution was about 9.15. To this was added about 240 g. of a 50% water solution of acetaldehyde (2.73 moles). The molar ratio of urea to acetaldehyde was about 1.46 to 1. The starting temperature was about 24° C. Concentrated sulfuric acid was diluted 1:1 with water and added to reduce the pH of the urea-aldehyde solution to about 4. In about 26 minutes the pH had dropped to about 3.4 and the temperature rose to about 53° C. from the exothermic reaction. The temperature peaked at about 60° C. after about 90 minutes, and the pH had risen to about 3.55. The temperature stabilized and after about 80 minutes the pH had risen to about 3.65. The solution was then neutralized with 45% potassium hydroxide to a pH of about 6.95 and cooled to room temperature. This solution contained about 15.2% actual nitrogen and had a specific gravity of about 1.126 g./ml, remaining clear for over a year.

EXAMPLE 2

This example shows that a stable, clear solution does not result when propionaldehyde is substituted for acetaldehyde in the reaction with urea under similar conditions as in Example 1.

About 170 g. of urea (2.79 moles) were dissolved in about 240 g. of water. About 108 g. of 100% propionaldehyde (1.86 moles) were added. Fifty percent sulfuric acid was used to reduce the pH of about 4. The initial process drove the temperature to about 66.5° C. and the pH dropped to about 3.4. After about 20 minutes the temperature dropped to about 55.5° C. and the pH rose to about 3.65. Forty-five percent caustic potash was used to raise the pH to about 7.1.

The solution remained clear for two days, and then began to cloud up. Within one week there was sufficient precipitation to turn the mixture into a soft solid. After 10 days the solidification was hard. The urea to propionaldehyde molar ratio was about 1.5 to 1.

EXAMPLE 3

This example demonstrates the preparation of a stable, clear solution of the reaction product of urea and a mixture of acetaldehyde and propionaldehyde.

About 1565.3 g. of a 50% aqueous solution of urea (13 moles) were mixed with about 253 g. of acetaldehyde (5.74 moles) and about 110.2 g. of propionaldehyde (1.9 moles) to yield a clear solution. The molar ratio of urea to total aldehyde was about 1.7 to 1 and the acetaldehyde to propionaldehyde molar ratio was about 3 to 1. Fifty percent sulfuric acid was added to adjust the pH to about 3.95. The temperature rose to about 64° C. in a few minutes. After about 90 minutes, the temperature had dropped to about 56° C. and the pH was about 5.2. The reaction was terminated by adjusting the pH to about 6.7 with 45% caustic potash and the system cooled. The actual nitrogen content was about 18.8% and unreacted urea nitrogen content about 2.33%. The Brookfield Viscosity using a No. 1 spindle at 60 r.p.m was about 15 cps. The solution remained clear for more than seven months.

EXAMPLE 4

This example demonstrates the preparation of a stable, clear solution of the reaction product of urea and a mixture of acetaldehyde and propionaldehyde where the propionaldehyde is in substantial excess over the acetaldehyde.

About 782.6 g. of a 53% aqueous solution of urea (6.52 moles) were mixed with about 167.0 g. of propionaldehyde (2.88 moles) and about 84.48 g. of a 50% aqueous solution of acetaldehyde (0.96 moles) to produce a clear solution. The molar ratio of urea to total aldehyde was about 1.7 to 1 and the molar ratio of propionaldehyde to acetaldehyde was about 3 to 1. The pH was adjusted to about 3.0 with 50% sulfuric acid. The temperature rose to about 70° C. then dropping to about 56° C. while the pH rose to about 3.9. The pH was again adjusted to about 3.0 with 50% sulfuric acid and the temperature maintained at about 56° C. for about one hour with the addition of heat. The pH was then raised by addition of 45% caustic potash to about 7.0 and the solution cooled to room temperature. The solution, which had an actual nitrogen of about 18%, remained clear and stable for over six months.

EXAMPLE 5

This example demonstrates the ability of the urea-mixed aldehyde reaction product to be made into a complete fertilizer.

About 428 g. of the clear solution of Example 4 were mixed with about 30 g. of commercial ammonium polyphosphate solution having an N-P-K ratio of 10-34-0. Addition of about 42.65 g. of potassium chloride yielded a clear fertilizer solution having an N-P-K ratio of 16-2-5. The solution has remained clear for over six months.

EXAMPLE 6

This example demonstrates the effect of too low a reaction pH on the stability of the reaction products.

About 337.6 g. of a 50% aqueous solution of acetaldehyde (3.83 moles) was added to about 1165 g. of 33.6% aqueous urea (6.52 moles). The mixture produced a clear solution at about 30° C. The pH of the solution was adjusted to about 2 by the addition of 1:1 sulfuric acid. After about 80 minutes the reaction temperature had risen to about 62° C. and the pH had dropped to about 1.8. The pH was adjusted to 7.5 by the addition of 45% caustic potash. The urea to acetaldehyde ratio was about 1.7:1 and the nitrogen content about 18%. Within four days about 10% of the solids had precipitated indicating that pH of about 2 is too low for the production of soluble reaction products.

EXAMPLE 7

This example shows the preparation of a stable, clear solution of the urea-acetaldehyde reaction product at a higher ratio of urea to acetaldehyde.

About 271 g. of 50% aqueous acetaldehyde (3.08 moles) was added to about 740 g. of a 50% aqueous urea solution $6.16 moles). The pH was adjusted to about 4.0 by the addition of 1:1 sulfuric acid. Within about 20 minutes, the pH dropped to about 3.8 and the temperature rose to about 39° C. Heat was then applied so that the temperature rose to about 61° C. After about 110 additional minutes, the pH was adjusted to about 7.5 with 45% caustic potash and the temperature dropped. A stable, clear solution was obtained containing about 17% nitrogen and a urea to acetaldehyde mole ratio of about 2:1.

EXAMPLE 8

This example demonstrates the preparation of a stable, clear solution of the urea-acetaldehyde reaction product at a low ratio of urea to acetaldehyde.

About 417 g. of a 50% aqueous acetaldehyde solution (4.74 moles) was added to about 370 g. of urea (6.16 moles) and about 268 g. of water. The pH was adjusted to about 3 with 1:1 sulfuric acid at an initial temperature of about 30° C. In about 60 minutes the temperature had risen to about 52° C. The system was gently heated for about 30 minutes until the temperature reached about 70° C. The pH was then adjusted to about 7.2 with 45% caustic potash. A stable, clear solution was obtained containing about 17% nitrogen and a urea to acetaldehyde mole ratio of about 1.3:1.

EXAMPLE 9

This example demonstrates the preparation of a large batch of a stable, clear solution of the reaction product of urea and acetaldehyde at high urea to acetaldehyde ratio.

About 59 kg. of urea (98.2 moles) were dissolved in about 53.5 kg. of water at about 52° C. About 29.5 kg. of a 75% aqueous solution of acetaldehyde (504 moles) were added to the urea solution after it had been cooled to room temperature. Upon addition of the acetaldehyde the temperature rose to about 32° C. and the pH dropped to about 4.8. The pH was adjusted to about 3.8 by the addition of 1:1 sulfuric acid to start the reaction. The temperature rose to about 52° C. in about six minutes. About 5.4 kg. of urea was added to raise the nitrogen concentration to about 20%. The reaction was continued at elevated temperature for about 15 additional minutes. The pH was then adjusted to about 7.5 by the addition of 45% caustic potash. The mole ratio of urea to acetaldehyde was about 2.1:1. The resultant, clear solution remained clear for over one year.

EXAMPLE 10

This example demonstrates the ability of the urea-acetaldehyde reaction product to be made into a complete fertilizer having long-term stability.

About 91 kg. of the clear solution from Example 9 was mixed with about 5.9 kg. of agricultural grade potassium chloride (about 61% $K_2O$) and about 5.9 kg. of polyammonium phosphate. The resultant solution analyzed about 18-2-4 (N-P-K) and has been studied for shelf life. The complete fertilizer has remained stable for over a year.

EXAMPLE 11

This example demonstrates the effect of the application of the clear solution of Example 1 to turf.

About six grams of the clear solution of Example 1 were diluted with water to make about 28.4 g. of spray which was then applied to about 929 square cm of an about 0.635 cm high mixture of bent grass and poa annua green, without watering in. No detectable burning of the grass occurred (not even tip burn) over an observation period of several days.

EXAMPLE 12

This example demonstrates the long-term greening effect of the application of the clear solution of Example 9 to turf.

The clear solution from Example 9 was applied to Loretta perennial ryegrass at an application concentration of about 7.83 g. of nitrogen per square meter and rated for greening by visual turf examination with a rating of 9 being the "greenest". The results below are for averages of 3 replications.

| Days After Application | | | | | |
|---|---|---|---|---|---|
| 5 | 11 | 17 | 22 | 27 | 32 |

| Visual Turf Rating | | | | | |
|---|---|---|---|---|---|
| Ex. 9 | 6.3 | 5.7 | 5.7 | 6.7 | 6.7 | 7.3 |
| Check | 2.7 | 2.0 | 2.0 | 2.3 | 2.2 | 2.5 |

This study, carried out at Michigan State University, shows that the clear solution of Example 9 has a long-term fertilizing effect.

I claim:

1. A process for preparing a clear aqueous fertilizer solution of the reaction products of urea and acetaldehyde which comprises:
    (a) reacting urea with acetaldehyde in an aqueous medium at a pH from about 3.1 to 4.5 at temperatures from about 30° C. to 75° C. to form a clear solution wherein the mole ratio of urea to acetaldehyde is from about 1.3 to 2.5:1, the total nitrogen concentration is from about 10% to 22% based on the weight of nitrogen in the urea; and
    (b) neutralizing said solution to a pH of from about 6.5 to 8.0.
2. The process of claim 1 wherein the mole ratio of urea to acetaldehyde is from about 1.3:1 to 2:1.
3. The process of claim 1 wherein urea is reacted with acetaldehyde at a pH from about 3.1 to 4.0.
4. The process of claim 1 wherein the urea is reacted with acetaldehyde at temperatures from about 40° C. to 70° C.
5. The process of claim 1 wherein the nitrogen concentration is from about 12% to 20% based on the weight of nitrogen in the urea.
6. The process of claim 1 wherein said solution is neutralized to a pH from about 6.8 to 7.5.
7. A fertilizer product comprising the clear solution prepared by the process of claim 1.
8. A process of preparing a clear aqueous fertilizer solution of the reaction products of urea and a mixture of acetaldehyde and propionaldehyde which comprises:
    (a) reacting urea with a mixture of acetaldehyde and propionaldehyde wherein the mole ratio of propionaldehyde to acetaldehyde is not greater than about 3:1 in an aqueous medium at a pH from about 3.1 to 4.5 at temperatures from about 30° C. to 75° C. to form a clear solution wherein the mole ratio of urea to said mixture of acetaldehyde and propionaldehyde is from about 1.3:1 to 2.5:1, the total nitrogen concentration is from about 10% to 22% based on the weight of nitrogen in the urea; and
    (b) neutralizing said solution to a pH from about 6.5 to 8.0.
9. The process of claim 8 wherein the mole ratio of urea to said mixture of acetaldehyde and propionaldehyde is from about 1.3:1 to 2:1.
10. The process of claim 8 wherein urea is racted with said mixture of acetaldehyde and propionaldehyde at a pH from about 3.1 to 4.0.
11. The process of claim 8 wherein the urea is reacted with said mixture of acetaldehyde and propionaldehyde at temperatures from about 40° C. to 70° C.
12. The process of claim 8 wherein the nitrogen concentration is from about 12% to 20% based on the weight of nitrogen in the urea.
13. The process of claim 8 wherein said solution is neutralized to a pH from about 6.8 to 7.5.
14. A fertilizer product comprising the clear solution prepared by the process of claim 8.

* * * * *